United States Patent
Regupathy et al.

(10) Patent No.: US 11,392,512 B2
(45) Date of Patent: Jul. 19, 2022

(54) USB METHOD AND APPARATUS IN A VIRTUALIZATION ENVIRONMENT WITH MULTI-VM

(71) Applicant: Intel Corporation, Santa Clara, CA (US)

(72) Inventors: Rajaram Regupathy, Bangalore (IN); Abdul R. Ismail, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 16/162,134

(22) Filed: Oct. 16, 2018

(65) Prior Publication Data

US 2019/0050350 A1    Feb. 14, 2019

(51) Int. Cl.
*G06F 13/10* (2006.01)
*G06F 9/455* (2018.01)
*G06F 9/4401* (2018.01)

(52) U.S. Cl.
CPC .......... *G06F 13/102* (2013.01); *G06F 9/4411* (2013.01); *G06F 9/45533* (2013.01); *G06F 9/45558* (2013.01); *G06F 13/105* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,327,137 B1* | 12/2012 | Erb .................. | G06F 21/85 713/164 |
| 2001/0027500 A1* | 10/2001 | Matsunaga .......... | G06F 13/385 710/104 |
| 2008/0222309 A1* | 9/2008 | Shanbhogue ........ | G06F 21/566 709/250 |
| 2012/0030676 A1* | 2/2012 | Smith ................... | G06F 21/57 718/1 |
| 2016/0062940 A1* | 3/2016 | Cota-Robles ....... | G06F 13/4221 710/313 |
| 2017/0052830 A1* | 2/2017 | Gambardella ......... | H04L 65/80 |
| 2018/0239632 A1* | 8/2018 | Hardy ................... | G06F 21/60 |

* cited by examiner

*Primary Examiner* — Charles E Anya
(74) *Attorney, Agent, or Firm* — Schwabe, Williamson & Wyatt, P.C.

(57) ABSTRACT

Apparatuses, methods and storage medium associated with virtualizing a USB device controller of a SoC in a computing platform hosting multiple VMs, are disclosed herein. In some embodiments, a CRM includes instructions to implement a USB driver stack in a SOS of a SVM on the computing platform. The USB driver stack of the SOS includes a SOS device controller driver to communicate with one or more USB devices of the computing platform, via a USB device controller of the SoC; and a SOS function virtualization driver to communicate with one or more corresponding UVM function virtualization drivers of the UVMs to paravirtualize the SOS device controller driver to the UVMs. Other embodiments are also described and claimed.

13 Claims, 5 Drawing Sheets

Non-transitory computer-readable storage medium
502

Programming Instructions 504
configured to cause a device, in response to execution of the
programming instructions, to practice (aspects of)
embodiments of the process(es) of Figures 1-3.

Figure 5

USB METHOD AND APPARATUS IN A VIRTUALIZATION ENVIRONMENT WITH MULTI-VM

TECHNICAL FIELD

The present disclosure relates to the field of computing. More particularly, the present disclosure relates to Universal Serial Bus (USB) method and apparatus for a virtualization environment with multi-virtual machines (VMs).

BACKGROUND

The background description provided herein is for purpose of generally presenting the context of the disclosure. Unless otherwise indicated herein, the materials described in this section are not prior art to the claims in this application and are not admitted to be prior art by inclusion in this section.

Universal Serial Bus (USB) has evolved over more than a decade as a ubiquitous interface for connecting peripherals to a computing system. The evolution of USB bus speed in these years started from to 1.5 Mbps in USB 1.1 specification, and evolved to 10 Gbps in the current USB 3.1 specification. With the introduction of USB Type-C port and USB Power Delivery specifications, the USB-C port has extended the USB port functionality to power and display. The USB-C port has been enabled to expand the bandwidth of USB to 20 Gbps with the introduction of USB 3.2 specification, which uses addition signal lines made available by the USB-C ports. USB Class specifications, which define the functionalities above the USB bus also evolved to take advantage of this USB bandwidth increase to provide better user experience and leveraging the capability of the USB bus. Resultantly, USB devices have become ubiquitous in computing.

Virtualization, in computing, is the technology to create virtual versions of hardware and/or software resources to allow the actual hardware and/or software resources to be shared across applications. Increasingly, virtualized platforms are used in many popular applications. For example, emerging automotive systems increasingly employ virtualized platforms. Such a virtualized platform often includes a hardware platform hosting a service virtual machine (VM) and a number of user VMs. The service VM hosts a service operating system (OS) to manage execution of secure and critical functions of the automotive system. Each user VM in turn hosts a user OS to manage execution of any one of a number of non-critical applications, such as infotainment, head unit, dashboard display functions, and so forth. Often the hardware platform employs a system on chip (SoC) having integrated processor, memory, and input/output (I/O) interfaces/ports, including a USB controller supporting one or more USB ports.

In these platforms, at any point in time, the USB controller would be passed through to a particular one of the multitude of OS. When the USB controller is passed through to a particular OS, it limits the possibility of having a reliable high bandwidth plug and play transport for other OS. Further, very often, the USB port is the primary medium for debugging. Limiting the availability of the USB port to a particular OS would limit the debugging capability of such complicated system. In turn, it leads to an almost non-debuggable complicated system. Still further, in some applications, the OS are isolated in different run zones based on the criticality of the functions the OS host, to ensure high availability of resources for the critical functions. One of the key functionality with USB device mode is screen projection (e.g., for Apple Car Play), where USB is used to project a hand held screen to the car's dashboard. With the USB device mode made pass through onto a particular OS supporting critical functionalities, load imbalances may arise.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 illustrates a storage medium having instructions for practicing methods described with references to FIGS. 1-3, according to various embodiments.

DETAILED DESCRIPTION

Figure 1:
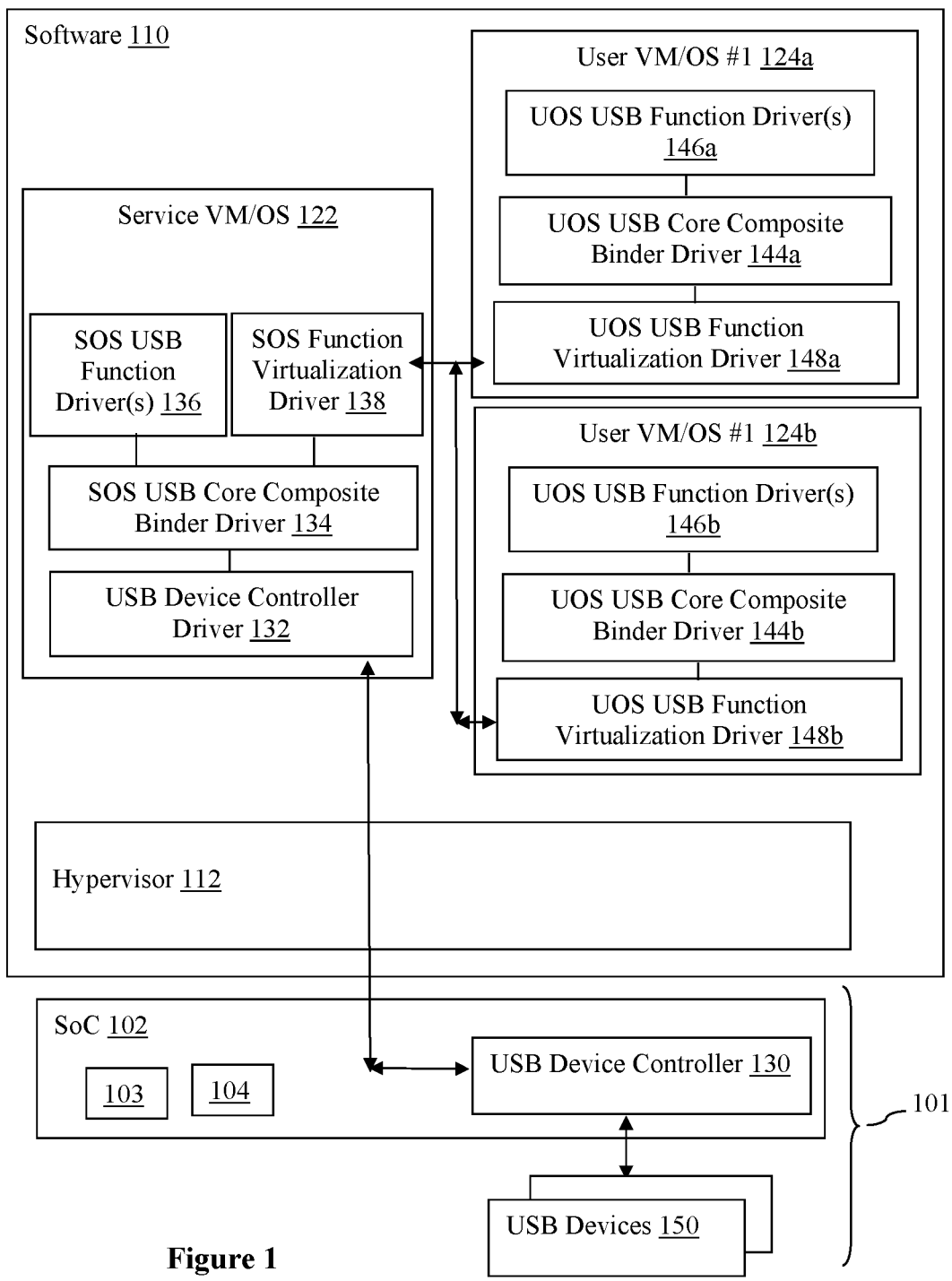
FIG. 1 illustrates an overview of an example virtualization environment with multi-VMs having the USB technology of the present disclosure, in accordance with various embodiments.

To address challenges discussed in the background section, apparatuses, methods and storage medium associated with provision and operation of USB devices in a virtualization environment having multi-VMs, are disclosed herein. In some embodiments, at least one computer-readable medium (CRM) has stored there in a plurality of instructions to implement a universal serial bus (USB) driver stack in a service operating system (SOS) of a service virtual machine (SVM) on a computing platform having a SoC hosting the SVM and a number of user virtual machines (UVMs), each UVM having a user operating system (UOS). The USB driver stack of the SOS includes at least a SOS device controller driver and a SOS function virtualization driver. The SOS device controller driver is configured to communicate with one or more USB devices of the computing platform, via a USB device controller of the SoC. The SOS function virtualization driver is coupled to the SOS device controller driver to communicate with one or more corresponding UOS function virtualization drivers of the UVMs to paravirtualize the SOS device controller driver to the UVMs. As a result, an application of any one of the UVMs may receive inputs from, or provide outputs to, one of the one or more USB devices, via the UOS function virtualization driver of the one UVM, the SOS function virtualization driver, the SOS device controller driver, and the USB device controller.

In some embodiments, the SOS function virtualization driver is arranged to expose one or more function interfaces to the one or more corresponding UOS function virtualization drivers of the UVMs, in response to exposure of the USB device controller driver into user space of the SOS by the SOS, on enumeration of the USB device controller by the SOS. Additionally, the SOS function virtualization driver is further arranged to accept attachment of one or more functions to the one or more function interfaces from the one or more corresponding UOS function virtualization drivers of the UVMs, in response to exposure of the one or more function interfaces to the one or more corresponding UOS function virtualization drivers of the UVMs. Still further, the SOS function virtualization driver is arranged to propagate the one or more functions attached from the one or more UVMs, to the SOS, on attachment of the one or more functions to the one or more function interfaces exposed by the SOS function virtualization driver.

In some embodiments, the USB driver stack of the SOS further includes one or more SOS USB function drivers, each to provide function-specific support for a function of one of the one or more USB devices in the SOS, and a SOS core composite binder driver coupled to the SOS USB function driver, the SOS function virtualization driver, and the SOS device controller driver to provide cross function support to the SOS USB function drivers and the SOS function virtualization driver in their interactions with the SOS device controller driver.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an example virtualization environment with multi-VMs having the USB technology of the present disclosure, in accordance with various embodiments, is illustrated. As shown, for the illustrated embodiments, virtualization environment 100 includes hardware 101 and software 110. Hardware 101 includes in particular, SoC 102 and a number of USB devices 150 coupled to each other as shown. Software 110 includes hypervisor 112 hosting a number of VMs, in particular, SVM 122 having a SOS, and a number of UVMs 124a-124b, each having a UOS.

SoC 102 includes USB device controller 130 configured to facilitate inclusion of USB devices 150 in virtualization environment 100. In particular, USB device controller 130 is configured to handle physical layer communications to and from USB devices 150 to enumerate USB devices 150, assign addresses to USB devices 150, establish communication pipes (logical channels) with function endpoints of USB devices 150, exchange communications over the pipes, and so forth. In embodiments, USB device controller 130 is configured to handle physical layer communications to and from USB devices 150, in accordance with USB Specification 3.x (i.e., 3.2 released September 2017, 3.1 released July 2013, or 3.0 released November 2008) or USB Specification 2.0, released April 2000.

Hypervisor 112 is configured to virtualize SoC 102, and host VM 122, 124a and 124b. Hypervisor 112 may be any one of a number of hypervisor known in the art, including, but are not limited to, KVM, an open source hypervisor, Xen, available from Citrix Inc., of Fort Lauderdale, Fla., or VMware, available from VMware Inc. of Palo Alto, Calif., and so forth.

Each VM 122, 124a or 124b, more specifically, its OS, includes a USB driver stack to facilitate interaction with USB device controller 130, to make available USB devices 150 in the corresponding VM 122, 124a or 124b. Except for the teaching incorporated in the USB software stack, each OS may be any otherwise be any one of a number of OS known in the art, such as Linux, available e.g., from Red Hat Enterprise of Raleigh, N.C., or Android, available from Google of Mountain View, Calif.

Each USB driver stack includes teachings of the present disclosure, to allow USB device controller 130 to be virtualized, and thus accessible to VMs 122, 124a and 124b, at the same time, to interact with USB devices 150, in a shared/arbitrated manner. In particular, for the illustrated embodiments, each USB driver stack is provided with a function virtualization driver, i.e., SOS function virtualization driver 138 in the case SOS of SVM 122, and UOS function virtualization drivers 148a and 148b for UOS of UVM 124a and 124b, to collaborate to allow USB device controller 130 to be virtualized, and thus accessible to VMs 122, 124a and 124b, at the same time, to interact with USB devices 150, in the shared/arbitrated manner. These and other aspects of the USB technology for virtualization environment with multi-VMs will be further described below with additional references to FIG. 1 and references to remaining FIGS. 2-5, after further describing elements of virtualization environment 100.

As described earlier, hardware 101 of virtualization environment 100 includes SoC 102 and USB devices 150. SoC 102 includes USB device controller 130 to facilitate provision of USB devices 150 to virtualization environment 100. Examples of USB devices 150 may include, but are not limited to, audio devices, communication devices, human interface devices, physical devices, still imaging devices, printer devices, mass storage devices, hubs, smart card devices, content security devices, video devices, personal health care devices, billboard devices, and so forth.

In various embodiments, each USB device 150 is accessed by a USB address that is assigned when the USB device is attached and enumerated. All USB devices 150 support a specially designated pipe at endpoint zero to which the USB device's USB control pipe will be attached. All USB devices 150 support a common access mechanism for accessing information through this control pipe. Associated with the control pipe at endpoint zero is the information required to completely describe the USB device.

This information falls into the following categories:
Standard: This is information whose definition is common to all USB devices and includes items such as vendor identification, device class, and power management capability. Device, configuration, interface, and endpoint descriptions carry configuration-related information about the device.
Class: The definition of this information varies, depending on the device class of the USB device.
USB Vendor: The vendor of the USB device is free to put any information desired here.

USB devices 150 report their attributes using descriptors. Each descriptor is a tree like data structure with a defined format. A device descriptor describes general information about a USB device 150. It includes information that applies globally to the USB device 150 and all of the device's configurations. A USB device 150 has only one device descriptor. A configuration descriptor describes information about a specific device configuration. A USB device 150 may have one or more configuration descriptors. Each configuration has one or more interfaces and each interface may have zero or more endpoints. An endpoint is not shared among interfaces within a single configuration unless the endpoint is used by alternate settings of the same interface. Endpoints may be shared among interfaces that are part of different configurations without this restriction. An interface descriptor describes a specific function within a configuration. An interface may include alternate settings that allow the endpoints and/or their characteristics to be varied after the device has been configured. The default setting for an interface is always alternate setting zero. Each endpoint used for an interface has its own descriptor. This descriptor contains the information required by the host to determine the bandwidth requirements of each endpoint. It should be noted that USB functions are clearly separated from the underlying USB logical or bus activities thus allowing a USB device 150 to implement multiple function in the same device called a composite USB device. Example of composite devices including, but are not limited to, consumer electronic devices like cameras, printers, mobile phones, and so forth, which uses single USB port to share multiple functions.

Continuing to refer to FIG. 1, in addition to USB device controller 130, SoC 102 may include other embedded components (also referred to as intellectual property, or IP) (not shown). Examples of embedded components may include, but are not limited to, central processing units (CPUs) 103, which may be single or multi-core, graphics engine, computer vision (CV) or decision logic (DL) accelerators, flash or other persistent storage, wired or wireless networking controllers, general purpose input/output (GPIO) controllers, storage controllers, memory controller, memory 104 and so forth. Various portions of memory 104 may be respectively allocated to the various VMs. In some embodiments, a portion of memory 104 may be used as shared memory, accessible to all VMs.

In various embodiments, in addition to SoC 102 and USB devices 150, hardware 101 may include other non-USB hardware elements, e.g., industry standard architecture (ISA) devices, serial advanced technology attachment (SATA) devices, peripheral component interface (PCI) or PCI-express (PCIe) devices, and so forth, with corresponding controllers provided as discrete elements outside of SoC 102, or embedded with SoC 102. Examples of ISA, SATA and/or PCI/PCIe devices may include, but are not limited to volatile memory devices, mass storage devices, displays, sensors, wired or wireless networking transceivers, and so forth. Examples of sensors may include, but are not limited to, global positioning system (GPS) sensors, gyroscopes, accelerometers, temperature sensors, humidity sensors, light detection and ranging (LiDAR) sensors, and so forth. Wired or wireless networking transceivers may include, but are not limited to, Ethernet, Bluetooth®, WiFi, Long Term Evolution LTE 4G/5G transceivers. Examples of displays may include, but are not limited to, liquid crystal displays (LCD) or light emitting diodes (LED displays. The displays may also be touch sensitive.

It should be noted that the example USB devices and non-USB devices listed are not meant to be mutually exclusive. Various example devices could be implemented with USB support or non-USB support.

Still referring to FIG. 1, in addition to SOS function virtualization driver 138, the USB driver stack in SOS of SVM 122 further includes USB device controller driver 132 configured to operate USB device controller 130. In particular, USB device controller driver 132 is configured to enumerate USB devices 150, assign addresses to USB devices 150, establish communication pipes (logical channels) with function endpoints of USB devices 150, exchange communications with endpoints of USB devices 150 over the pipes, and so forth, using USB device controller 130. In embodiments, as noted earlier, USB device controller driver 132 operates USB device controller 130 in accordance with the protocols of USB Specification 3.x (i.e., 3.2 released September 2017, 3.1 released July 2013, or 3.0 released November 2008) or USB Specification 2.0, released April 2000.

Additionally, each of the USB driver stacks in SOS of SVM 122 and UOS of UVM 124a and 124b, includes one or more SOS or UOS function drivers 136, 148a or 148b, and a SOS or UOS core composite binder driver 134, 144a or 144b, communicatively coupled to each other, and to SOS or UOS function drivers 136, 148a or 148b and USB device controller driver 132 (in the case of SOS), as shown. Each SOS or UOS function drivers 136, 148a or 148b is configured to provide function specific support for a specific function of USB devices 150 in SOS of SVM 122 or UOS of UVM 124a/124b, making the specific function available to the SOS/UOS and applications executed under the control of the SOS/UOS. Examples of specific functions may include, but are not limited, audio functions, video functions, storage functions, printing functions, and so forth. Each SOS or UOS core composite binder driver 134, 144a or 144b is configured to provide cross function support for the functions supported by SOS or UOS function drivers 136, 148a or 148b, to lighten the requirements on SOS or UOS function drivers 136, 148a and 148b to support the corresponding functions. Example of cross function supports may include, but are not limited to, function independent read or write operations.

In various embodiments, SOS function virtualization driver 138 is configured to communicate with corresponding UOS function virtualization drivers of the UVMs to paravirtualize USB device controller driver 132 to UVMs 124a-124b. More specifically, SOS function virtualization driver 138 is arranged to expose one or more function interfaces to the one or more corresponding UOS function virtualization drivers 148a and 148b of the UVMs 124a-124b, in response to exposure of USB device controller driver 132 into user space of the SOS by the SOS, on enumeration of the USB device controller 130 by the SOS. Additionally, SOS function virtualization driver 138 is further arranged to accept attachment of one or more functions to the one or more function interfaces from the one or more corresponding UOS function virtualization drivers 148a-148b, in response to exposure of the one or more function interfaces to the one or more corresponding UOS function virtualization drivers 148a-148b. Still further, SOS function virtualization driver 138 is arranged to propagate the one or more functions attached from the one or more UVMs 124a-124b, to the SOS, on attachment of the one or more functions to the one or more function interfaces exposed by SOS function virtualization driver 138. In various embodiments, exposure of the functional interfaces from SVM 122 to UVM 124a-124b, and attachment of functions of UVM 124a-124b to the exposed function interfaces may be effectuated via any one of a number of known programmatic techniques, including e.g., but not limited to, via shared memory.

As a result, an application (not shown) of any one of the UVMs 124a-124b may receive inputs from, or provide outputs to, one of the one or more USB devices 150, via the UOS function virtualization driver 148a or 148b of the one UVM 124a or 124b, SOS function virtualization driver 138, USB device controller driver 132, and USB device controller 130.

Before further describing the USB technology for virtualization environment with multi-VMs, it should be noted that, while for ease of understanding, only two UVM 124a-124b are illustrated in FIG. 1, the present disclosure is not so limited. Embodiments of the USB technology of FIG. 1 for virtualization environment with multi-VMs of the present disclosure may be practiced in virtualization environment with any number of multi-VMs, subject only to the ability of the underlying hardware processing power in supporting the number of VMs.

Figure 2:
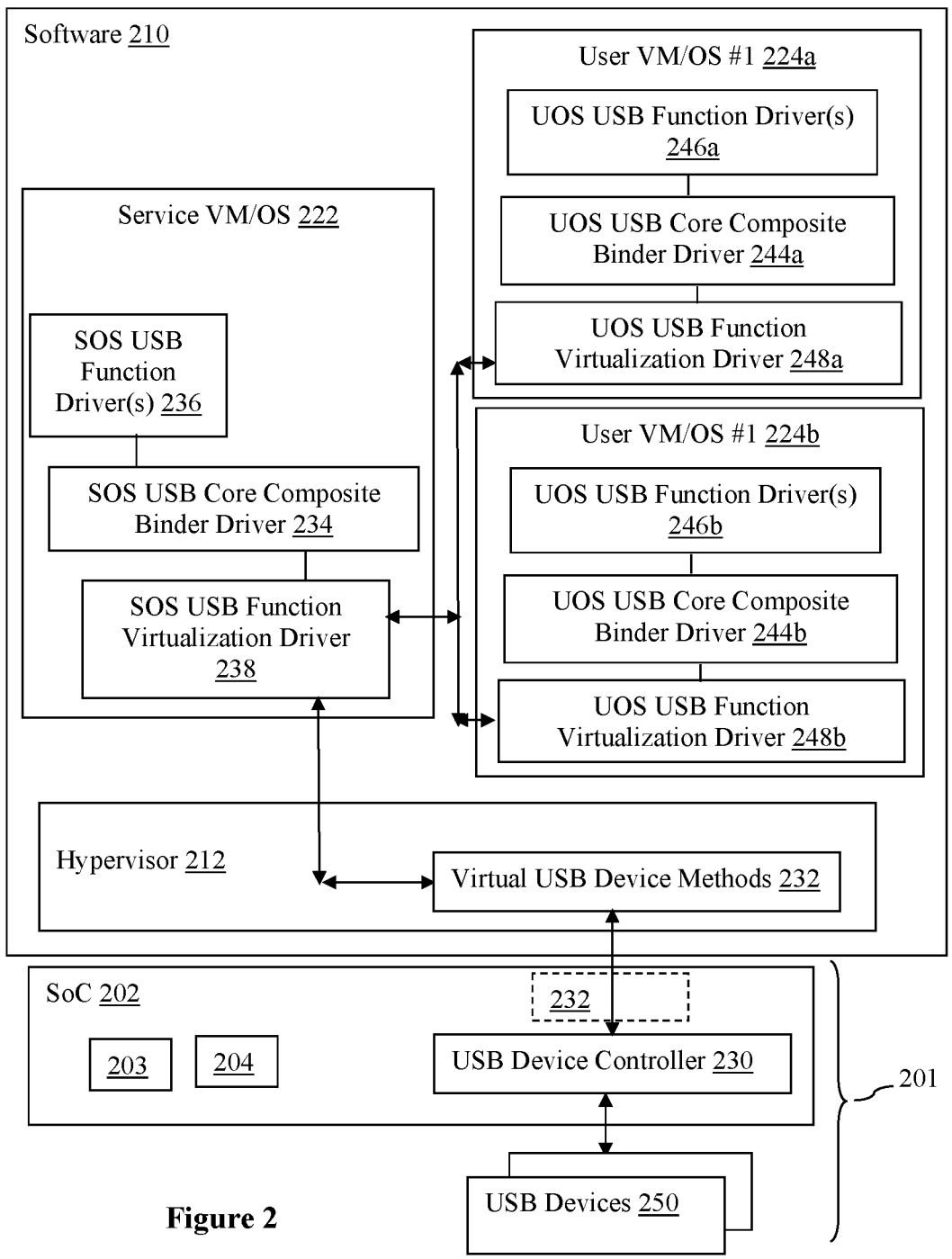
FIG. 2 illustrates an overview of another example virtualization environment with multi-VMs having the USB technology of the present disclosure, according to other embodiments.

FIG. 2 illustrates an overview of another example virtualization environment with multi-VMs having the USB technology of the present disclosure, according to other embodiments. For the illustrated embodiments, virtualization environment 200, similar to virtualization environment 100, includes hardware 201 and software 210. Similar to hardware 101, hardware 201 includes in particular, SoC 202 and a number of USB devices 250 coupled to each other as shown. Similar to software 110, software 210 includes hypervisor 212 hosting a number of VMs, in particular, SVM 222 having a SOS, and a number of UVMs 224a-224b, each having a UOS.

SoC 202, similar to SoC 102, includes USB device controller 230 configured, similar to USB device controller 130, to facilitate inclusion of USB devices 250 in virtualization environment 200. In embodiments, USB device controller 230, like USB device controller 130, is configured to handle physical layer communications to and from USB devices 250, in accordance with USB Specification 3.x (i.e., 3.2 released September 2017, 3.1 released July 2013, or 3.0 released November 2008) or USB Specification 2.0, released April 2000.

Hypervisor 212, for the illustrated embodiments, includes a number of virtual USB device methods 232 configured to collectively provide functionalities similar to those provided by USB device controller driver 132 to control operation USB device controller 230, to interact with USB devices 250. In various embodiments, virtual USB device methods 232 include methods for enumerating USB devices 250, assign addresses to USB devices 250, establish communication pipes (logical channels) with function endpoints of USB devices 250, exchange communications with endpoints of USB devices 250 over the pipes, and so forth. Except for inclusion of virtual USB device methods 232, hypervisor 212, like hypervisor 112, may be any one of a number of hypervisor known in the art, including, but are not limited to, KVM, an open source hypervisor, Xen, available from Citrix Inc., of Fort Lauderdale, Fla., or VMware, available from VMware Inc. of Palo Alto, Calif., and so forth.

Each VM 222, 224a or 224b, more specifically, its OS, like OS of VM 122, 124a or 124b, includes a USB driver stack to facilitate interaction with USB device controller 230, to make available USB devices 250 in the corresponding VM 222, 224a or 224b. Each OS, similar to OS of VM 122, 124a or 124b, may be any one of a number of OS known in the art, such as Linux, available e.g., from Red Hat Enterprise of Raliegh, N.C., or Android, available from Google of Mountain View, Calif.

Each USB driver stack includes teachings of the present disclosure, to allow virtual USB device methods 232, to be accessible to VMs 222, 224a and 224b, at the same time, to interact with USB devices 250, in a shared/arbitrated manner. In particular, for the illustrated embodiments, similar to the embodiments of FIG. 1, each USB driver stack is provided with a function virtualization driver, i.e., SOS function virtualization driver 238 in the case SOS of SVM 222, and UOS function virtualization drivers 248a and 248b for UOS of UVM 224a and 224b, to collaborate to allow virtual USB device methods 232 to be accessible to VMs 222, 224a and 224b, at the same time, to interact with USB devices 250, in the shared/arbitrated manner. These and other aspects of the USB technology for virtualization environment with multi-VMs will be further described below with additional references to FIG. 2 and references to remaining FIGS. 3-5, after further describing elements of virtualization environment 200.

As described earlier, hardware 201 of virtualization environment 200 includes SoC 202 and USB devices 250. SoC 202, similar to SoC 102, includes USB device controller 230 to facilitate provision of USB devices 250 to virtualization environment 200. Like USB devices 150, USB devices 250 may be any one of a number of USB devices known in the art, in particular, those earlier described example USB devices.

SoC 202, similar to SoC 102, may include other embedded components (IP) (not shown), in addition to USB device controller 230. These embedded components (IP) may likewise be any one of the earlier described example embedded components, in particular, CPU 203 and memory 204. Similar to memory 104, various portions of memory 204 may be respectively allocated to the various VMs. In some embodiments, a portion of memory 204 may be used as shared memory, accessible to all VMs. In various embodiments, in addition to SoC 202 and USB devices 250, hardware 201, like hardware 101, may include other non-USB hardware elements, in particular, the earlier described examples.

Continue to refer to FIG. 2, each of the USB driver stacks in SOS of SVM 222 and UOS of UVM 224a and 224b, includes one or more SOS or UOS function drivers 236, 248a or 248b, and a SOS or UOS core composite binder driver 234, 244a or 244b, communicatively coupled to each other, and to SOS or UOS function drivers 236, 248a or 248b, as shown. Each SOS or UOS function drivers 236, 248*a* or 248*b*, similar to SOS or UOS function drivers 136, 148*a* or 148*b*, is configured to provide function specific support for a specific function of USB devices 250 in SOS of SVM 222 or UOS of UVM 224*a*/224*b*, making the specific function available to the SOS/UOS and applications executed under the control of the SOS/UOS. Examples of specific functions may include, but are not limited, to the earlier described examples for USB devices 150. Each SOS or UOS core composite binder driver 234, 244*a* or 244*b*, similar to SOS or UOS core composite binder driver 134, 144*a* or 144*b* is configured to provide cross function support for the functions supported by SOS or UOS function drivers 236, 248*a* or 248*b*, to lighten the requirements on SOS or UOS function drivers 236, 248*a* and 248*b* to support the corresponding functions. Example of cross function supports may include, the earlier described cross function supports for SOS or UOS core composite binder driver 134, 144*a* or 144*b*.

In various embodiments, SOS function virtualization driver 238, similar to SOS function virtualization driver 138, is configured to communicate with corresponding UOS function virtualization drivers of the UVMs to paravirtualize virtual USB device methods 232 to UVMs 224*a*-224*b*. More specifically, SOS function virtualization driver 238, similar to SOS function virtualization driver 138, is arranged to expose one or more function interfaces to the one or more corresponding UOS function virtualization drivers 248*a* and 248*b* of the UVMs 224*a*-224*b*, in response to exposure of virtual USB device methods 232 into user space of the SOS by the SOS, on enumeration of the USB device controller 230 by the SOS. Additionally, SOS function virtualization driver 238 is further arranged to accept attachment of one or more functions to the one or more function interfaces from the one or more corresponding UOS function virtualization drivers 248*a*-248*b*, in response to exposure of the one or more function interfaces to the one or more corresponding UOS function virtualization drivers 248*a*-248*b*. Still further, SOS function virtualization driver 238, similar to SOS function virtualization driver 138, is arranged to propagate the one or more functions attached from the one or more UVMs 224*a*-224*b*, to the SOS, on attachment of the one or more functions to the one or more function interfaces exposed by SOS function virtualization driver 238. In various embodiments, exposure of the functional interfaces from SVM 222 to UVM 224*a*-224*b*, and attachment of functions of UVM 224*a*-224*b* to the exposed function interfaces may likewise be effectuated via any one of a number of known programmatic techniques, including e.g., but not limited to, via shared memory.

As a result, an application (not shown) of any one of the UVMs 224*a*-224*b* may receive inputs from, or provide outputs to, one of the one or more USB devices 250, via the UOS function virtualization driver 248*a* or 248*b* of the one UVM 224*a* or 224*b*, SOS function virtualization driver 238, virtual USB device methods 232, and USB device controller 130.

Similar to the embodiments of FIG. 1, while for ease of understanding, only two UVM 224*a*-224*b* are illustrated in FIG. 2, the present disclosure is not so limited. Embodiments of the USB technology of FIG. 2 for virtualization environment with multi-VMs of the present disclosure, may be practiced in virtualization environments with any number multi-VMs, subject only to the capability of the underlying hardware processing power in supporting the number of VMs. Further, in some embodiments, some or all of virtual USB device methods 232 may be disposed with SoC 202 instead, as denoted by the dotted line box labelled 232.

Figure 3:
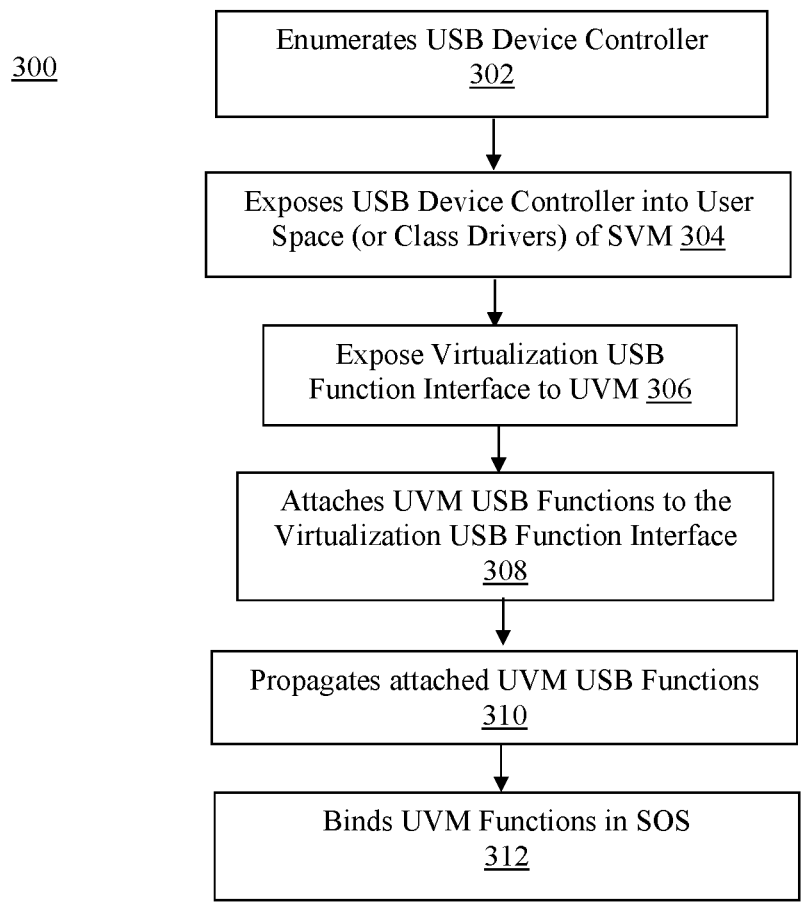
FIG. 3 illustrates an example USB process for a virtualization environment with multi-VMs, according to various embodiments.

Referring now to FIG. 3, wherein an example USB process for a virtualization environment with multi-VMs, according to various embodiments, is illustrated. As shown, for the illustrated embodiments, process 300 for facilitating inclusion of USB devices in a virtualization environment with multi-VMs, allowing the USB devices to be shared and available to all VMs in the virtualization environment, in an arbitrated manner, includes operations at blocks 302-312. As will be described, the operations may be performed e.g., by the OS of SVM 110/210, SOS USB function virtualization driver 138/238, USB device controller driver 132 and/or virtual USB device methods 232.

As shown, for the illustrated embodiments, process 300 starts at block 302. At block 302, the USB device controller of the SoC is enumerated, e.g., by the SOS of the SVM, in particular, by the earlier described USB device controller driver of a USB software stack of a SOS of a SVM in the virtualization environment. Next, at block 304, the enumerated USB device controller is exposed to the user space (or USB function/class drivers) of the SVM, e.g., by the USB device controller driver of the USB software stack of the SOS to the user space of SOS (or to function/class drivers of the earlier described core composite binder driver of the USB software stack of the SOS).

At block 306, a virtualization USB function interface is exposed from the SVM to the UVMs, in response to the exposure of the USB device controller to the user space (or class drivers) of the SVM. For example, a virtualization function interface may be exposed by the earlier described SOS USB function virtualization driver of a USB software stack of the SOS to the earlier described counterpart corresponding UOS USB function virtualization drivers of USB software stacks of the UOS of the UVMs.

At block 308, USB functions supported in the UVMs are attached to the virtualization USB function interface, in response to its exposure to the UVMs. For example, the USB functions supported in the UVMs may be attached to the virtualization USB function interface, by the corresponding UOS USB function virtualization drivers of the USB software stacks of the UOS of the UVMs.

At block 310, the attached USB functions supported in the UVM are propagated from the virtualization USB function interface to the lower layers of the USB software stack in the SOS of the SVM, in response to their attachments. For example, the earlier described SOS USB function virtualization driver of the USB software stack of the SOS may propagate the attached USB functions supported in the UVM to the core composite binder driver of the USB software stack of the SOS.

At block 312, the propagated USB functions supported in the UVM are bound in the USB software stack of the SOS, thus making the USB devices of the virtualization environment available to the UVMs concurrently, in an arbitrated manner. For example, the earlier described core composite binder driver of the USB software stack of the SOS may bind the propagated USB functions supported in the UVM, and couple the propagated USB functions supported in the UVM to the USB device controller driver of the USB software stack of the SOS, or to the earlier described virtual USB device methods of a hypervisor managing the SOS.

Figure 4:
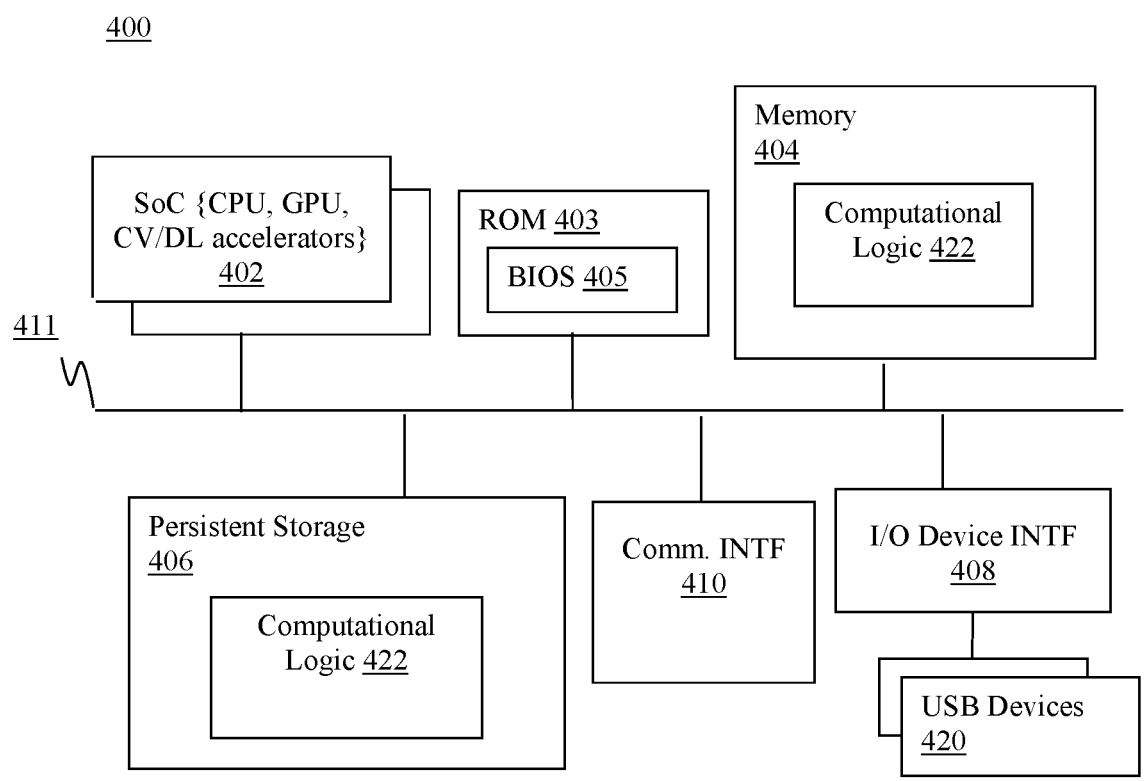
FIG. 4 illustrates a hardware component view of a computer platform suitable for use to practice the present disclosure, according to various embodiments.

Referring now to FIG. 4, wherein an example computing platform that may be suitable for use to practice the present disclosure, according to various embodiments, is illustrated. As shown, computing platform 400, which may be hardware 101 or 102 of FIG. 1 or 2, may include one or more system-on-chips (SoCs) 402, ROM 403 and system memory 404. Each SoCs 402, which may be SoC 102 or 202, may include one or more processor cores (CPUs), one or more graphics processor units (GPUs), one or more accelerators, such as computer vision (CV) and/or deep learning (DL) accelerators. ROM 403 may include basic input/output system services (BIOS) 405. CPUs, GPUs, and CV/DL accelerators may be any one of a number of these elements known in the art. Similarly, ROM 403 and BIOS 405 may be any one of a number of ROM and BIOS known in the art, and system memory 404 may be any one of a number of volatile storage known in the art.

Additionally, computing platform 400 may include persistent storage devices 406. Example of persistent storage devices 406 may include, but are not limited to, flash drives, hard drives, compact disc read-only memory (CD-ROM) and so forth. Further, computing platform 400 may include one or more input/output (I/O) interfaces 408 to interface with one or more I/O devices, such as USB devices 420, which may be USB devices 150 or 250. Other example I/O devices may include, but are not limited to, display, keyboard, cursor control and so forth. Computing platform 400 may also include one or more communication interfaces 410 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 411, which may represent one or more buses. In the case of multiple buses, they may be bridged by one or more bus bridges (not shown).

Each of these elements may perform its conventional functions known in the art. In particular, ROM 403 may include BIOS 405 having a boot loader. System memory 404 and mass storage devices 406 may be employed to store a working copy and a permanent copy of the programming instructions implementing the operations associated with hypervisor 112/212, service/user OS of service/user VM 122/222, 124a-124b, and 224a-224b, and components of the USB technology of the present disclosure (such as, SOS/UOS USB function drivers 136 and 146a-146b, SOS/UOS function virtualization drivers 138/238, 148a-148b and 248a-248b, SOS/UOS USB core composite binder drivers 134/234, 144a-144b and 244a-244b, USB driver controller 132, and virtual USB device methods 230), collectively referred to as computational logic 422. The various elements may be implemented by assembler instructions supported by processor core(s) of SoCs 402 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 502 may include a number of programming instructions 1204. Programming instructions 504 may be configured to enable a device, e.g., computing platform 400, in response to execution of the programming instructions, to implement (aspects of) hypervisor 112/212, service/user OS of service/user VM 122/222, 124a-124b and 224a-224b, and components of the USB technology of the present disclosure (such as SOS/UOS USB function drivers 136 and 146a-146b, SOS/UOS function virtualization drivers 138/238, 148a-148b and 248a-248b, SOS/UOS USB core composite binder drivers 134/234, 144a-144b and 244a-244b, USB driver controller 132, and virtual USB device methods 232). In alternate embodiments, programming instructions 504 may be disposed on multiple computer-readable non-transitory storage media 502 instead. In still other embodiments, programming instructions 504 may be disposed on computer-readable transitory storage media 502, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 is at least one computer-readable medium (CRM) having stored there in a plurality of instructions to implement a universal serial bus (USB) driver stack in a service operating system (SOS) of a service virtual machine (SVM) on a computing platform having a system-on-chip (SoC) hosting the SVM and a number of user virtual machines (UVMs), each UVM having a user operating system (UOS), the USB driver stack of the SOS comprising: a SOS device controller driver to communicate with one or more USB devices of the computing platform, via a USB device controller of the SoC; and a SOS function virtualization driver coupled to the SOS device controller driver to communicate with one or more corresponding UOS function virtualization drivers of the UVMs to paravirtualize the SOS device controller driver to the UVMs; wherein an application of one of the UVMs receives inputs from, or provides outputs to, one of the one or more USB devices, via the UOS function virtualization driver of the one UVM, the SOS function virtualization driver, the SOS device controller driver, and the USB device controller.

Example 2 is example 1, wherein the SOS function virtualization driver is arranged to expose one or more function interfaces to the one or more corresponding UOS function virtualization drivers of the UVMs, in response to exposure of the USB device controller driver into user space of the SOS by the SOS, on enumeration of the USB device controller by the SOS.

Example 3 is example 2, wherein the SOS function virtualization driver is further arranged to accept attachment of one or more functions to the one or more function interfaces from the one or more corresponding UOS function virtualization drivers of the UVMs, in response to exposure of the one or more function interfaces to the one or more corresponding UOS function virtualization drivers of the UVMs.

Example 4 is example 3, wherein the SOS function virtualization driver is further arranged to propagate the one or more functions attached from the one or more UVMs, to the SOS, on attachment of the one or more functions to the one or more function interfaces exposed by the SOS function virtualization driver.

Example 5 is any one of examples 1-4, wherein the USB driver stack of the SOS further comprises: a SOS USB function driver to provide function-specific support for a function of one of the one or more USB devices in the SOS; and a SOS core composite binder driver coupled to the SOS USB function driver, the SOS function virtualization driver, and the SOS device controller driver to provide cross function support to the SOS USB function driver and the SOS function virtualization driver in their interactions with the SOS device controller driver.

Example 6 is example 5, wherein the USB driver stack of the SOS further comprises a USB device controller driver coupled to the SOS core composite binder driver, and arranged to enumerate the one or more USB devices, assign addresses to the one or more USB devices, establish communication pipes with function endpoints of the one or more USB devices, or exchange communications with endpoints of USB devices over the communication pipes.

Example 7 is at least one computer-readable medium (CRM) having stored there in a plurality of instructions to implement a universal serial bus (USB) driver stack in a service operating system (SOS) of a service virtual machine (SVM) on a computing platform having a system-on-chip (SoC), the USB driver stack of the SOS comprising: a SOS function virtualization driver coupled to a SOS device controller driver to communicate with one or more corresponding user operating system (UOS) function virtualization drivers of user virtual machines (UVMs) to paravirtualize a plurality of virtual methods of a USB device controller of the SoC to the UVMs; wherein an application of one of the UVMs receives inputs from, or provides outputs to, one of one or more USB devices, via the UOS function virtualization driver of the one UVM, the SOS function virtualization driver, and the virtual methods of the USB device controller.

Example 8 is example 7, wherein the SOS function virtualization driver is arranged to expose one or more function interfaces to the one or more corresponding UOS function virtualization drivers of the UVMs, in response to exposure of the plurality of virtual methods of the USB device controller of the SoC into user space of the SOS by the SOS, on enumeration of the USB device controller driver by the SOS.

Example 9 is example 8, wherein the SOS function virtualization driver is further arranged to accept attachment of one or more functions to the one or more function interfaces by the one or more corresponding UOS function virtualization drivers of the UVMs, in response to exposure of the one or more function interfaces to the one or more corresponding UOS function virtualization drivers of the UVMs.

Example 10 is example 9, wherein the SOS function virtualization driver is further arranged to propagate the one or more functions attached from the UVMs, to the SOS, on attachment of the one or more functions to the one or more function interfaces exposed by the SOS function virtualization driver.

Example 11 is any one of examples 7-10, wherein the USB driver stack of the SOS further comprises: one or more SOS USB function drivers to provide respective function-specific support for one or more functions of the one or more USB devices in the SOS; and a SOS core composite binder driver coupled to the one or more SOS USB function drivers to provide cross function support to the one or more SOS USB function drivers in their interactions with the SOS function virtualization driver.

Example 12 is an apparatus comprising: a central processing unit (CPU); a universal serial bus (USB) device controller to control one or more USB devices; and a plurality of virtual methods associated with the USB device controller to virtualize the USB device controller for a service virtual machine (SVM) and one or more user virtual machines (UVMs); wherein the USB device controller is virtualized to the one or more UVMs via the SVM, through usage of the virtual methods.

Example 13 is example 12, wherein the plurality of virtual methods include a method for enumerating the one or more USB devices, a method for assigning addresses to the one or more USB devices, a method for establishing communication pipes with function endpoints of the one or more USB devices, or a method for exchanging communications with endpoints of USB devices over the communication pipes.

Example 14 is example 12, wherein the apparatus is a system-on-chip (SoC) and hosts a hypervisor that hosts the SVM and the one or more UVMs, and the USB devices are coupled to a computing platform having the SoC.

Example 15 is example 12, wherein the apparatus is a computing platform having a system-on-chip (SoC) with the CPU, and a hypervisor having the plurality of virtual methods, and hosts the SVM and the one or more UVMs.

Example 16 is a method for operating on a computing platform having a service virtual machine (SVM), one or more user machines (UVMs), and one or more universal serial bus (USB) devices, comprising: exposing, from the SVM, one or more USB function interfaces to the one or more UVMs to paravirtualize a USB device controller disposed on a system-on-chip (SoC) of the computing platform to the one or more UVMs; and accepting attachment of one or more USB functions supported in the UVMs to the one or more USB function interfaces exposed from the SVM; wherein an application of one of the UVMs receives inputs from, or provides outputs to, one of the one or more USB devices, via the one or more USB function interfaces exposed from the SVM, and the USB device controller of the SoC.

Example 17 is example 16, wherein the exposing is performed in response to exposure of the USB device controller into user space of a service operating system (SOS).

Example 18 is example 17, further comprising exposing the USB device controller into the user space of the SOS, on enumeration of the USB device controller.

Example 19 is example 18, further comprising enumerating the USB device controller.

Example 20 is any one of examples 16-19, further comprising propagating the one or more USB functions attached from the one or more UVMs, to the SOS, on attachment of the one or more USB functions to the one or more USB function interfaces exposed.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. At least one non-transitory computer-readable storage medium having stored there in a plurality of instructions to implement a universal serial bus (USB) driver stack in a service operating system (SOS) of a service virtual machine (SVM) on a computing platform having a system-on-chip (SoC) hosting the SVM and a number of user virtual machines (UVMs), each UVM having a user operating system (UOS), the USB driver stack of the SOS comprising:

a SOS device controller driver to communicate with one or more USB devices of the computing platform, via a USB device controller of the SoC; and a SOS function virtualization driver coupled to the SOS device controller driver to communicate with one or more corresponding UOS function virtualization drivers of the UVMs to paravirtualize the SOS device controller driver to the UVMs, wherein an application of one of the UVMs receives inputs from, or provides outputs to, one of the one or more USB devices, via the UOS function virtualization driver of the one UVM, the SOS function virtualization driver, the SOS device controller driver, and the USB device controller, and wherein the SOS function virtualization driver is arranged to expose one or more function interfaces to the one or more corresponding UOS function virtualization drivers of the UVMs, in response to exposure of the USB device controller driver into user space of the SOS by the SOS, on enumeration of the USB device controller by the SOS.

2. The non-transitory computer-readable storage medium of claim 1, wherein the SOS function virtualization driver is further arranged to accept attachment of one or more functions to the one or more function interfaces from the one or more corresponding UOS function virtualization drivers of the UVMs, in response to exposure of the one or more function interfaces to the one or more corresponding UOS function virtualization drivers of the UVMs.

3. The non-transitory computer-readable storage medium of claim 2, wherein the SOS function virtualization driver is further arranged to propagate the one or more functions attached from the one or more UVMs, to the SOS, on attachment of the one or more functions to the one or more function interfaces exposed by the SOS function virtualization driver.

4. The non-transitory computer-readable storage medium of claim 1, wherein the USB driver stack of the SOS further comprises: a SOS USB function driver to provide function-specific support for a function of one of the one or more USB devices in the SOS; and a SOS core composite binder driver coupled to the SOS USB function driver, the SOS function virtualization driver, and the SOS device controller driver to provide cross function support to the SOS USB function driver and the SOS function virtualization driver in their interactions with the SOS device controller driver.

5. The non-transitory computer-readable storage medium of claim 4, wherein the USB driver stack of the SOS further comprises a USB device controller driver coupled to the SOS core composite binder driver, and arranged to enumerate the one or more USB devices, assign addresses to the one or more USB devices, establish communication pipes with function endpoints of the one or more USB devices, or exchange communications with endpoints of USB devices over the communication pipes.

6. At least one non-transitory computer-readable storage medium having stored there in a plurality of instructions to implement a universal serial bus (USB) driver stack in a service operating system (SOS) of a service virtual machine (SVM) on a computing platform having a system-on-chip (SoC), the USB driver stack of the SOS comprising:

a SOS function virtualization driver coupled to a SOS device controller driver to communicate with one or more corresponding user operating system (UOS) function virtualization drivers of user virtual machines (UVMs) to paravirtualize a plurality of virtual methods of a USB device controller of the SoC to the UVMs;

one or more SOS USB function drivers to provide respective function-specific support for one or more functions of the one or more USB devices in the SOS; and a SOS core composite binder driver coupled to the one or more SOS USB function drivers to provide cross function support to the one or more SOS USB function drivers in their interactions with the SOS function virtualization driver, wherein an application of one of the UVMs receives inputs from, or provides outputs to, one of one or more USB devices, via the UOS function virtualization driver of the one UVM, the SOS function virtualization driver, and the virtual methods of the USB device controller.

7. The non-transitory computer-readable storage medium of claim 6, wherein the SOS function virtualization driver is arranged to expose one or more function interfaces to the one or more corresponding UOS function virtualization drivers of the UVMs, in response to exposure of the plurality of virtual methods of the USB device controller of the SoC into user space of the SOS by the SOS, on enumeration of the USB device controller driver by the SOS.

8. The non-transitory computer-readable storage medium of claim 7, wherein the SOS function virtualization driver is further arranged to accept attachment of one or more functions to the one or more function interfaces by the one or more corresponding UOS function virtualization drivers of the UVMs, in response to exposure of the one or more function interfaces to the one or more corresponding UOS function virtualization drivers of the UVMs.

9. The non-transitory computer-readable storage medium of claim 8, wherein the SOS function virtualization driver is further arranged to propagate the one or more functions attached from the UVMs, to the SOS, on attachment of the one or more functions to the one or more function interfaces exposed by the SOS function virtualization driver.

10. A method for operating on a computing platform having a service virtual machine (SVM), one or more user machines (UVMs), and one or more universal serial bus (USB) devices, comprising:

exposing, from the SVM, one or more USB function interfaces to the one or more UVMs to paravirtualize a USB device controller disposed on a system-on-chip (SoC) of the computing platform to the one or more UVMs;

accepting attachment of one or more USB functions supported in the UVMs to the one or more USB function interfaces exposed from the SVM; and propagating the one or more USB functions attached from the one or more UVMs, to the SOS, on attachment of the one or more USB functions to the one or more USB function interfaces exposed, wherein an application of one of the UVMs receives inputs from, or provides outputs to, one of the one or more USB devices, via the one or more USB function interfaces exposed from the SVM, and the USB device controller of the SoC.

11. The method of claim 10, wherein the exposing is performed in response to exposure of the USB device controller into user space of a service operating system (SOS).

12. The method of claim 11, further comprising exposing the USB device controller into the user space of the SOS, on enumeration of the USB device controller.

13. The method of claim 12, further comprising enumerating the USB device controller.

* * * * *